(12) United States Patent
Qian et al.

(10) Patent No.: US 12,111,811 B2
(45) Date of Patent: Oct. 8, 2024

(54) EDA PAD PACKAGE LIBRARY UPDATING/APPLICATION METHOD AND SYSTEM, MEDIUM AND TERMINAL

(71) Applicant: VAYO (SHANGHAI) TECHNOLOGY CO., LTD., Shanghai (CN)

(72) Inventors: Shengjie Qian, Shanghai (CN); Fengshou Liu, Shanghai (CN)

(73) Assignee: Vayo (Shanghai) Technology Co. Ltd., Shanghai (CN)

( * ) Notice: Subject to any disclaimer, the term of this patent is extended or adjusted under 35 U.S.C. 154(b) by 816 days.

(21) Appl. No.: 17/262,447

(22) PCT Filed: Sep. 28, 2018

(86) PCT No.: PCT/CN2018/108339
§ 371 (c)(1),
(2) Date: Jan. 22, 2021

(87) PCT Pub. No.: WO2020/019502
PCT Pub. Date: Jan. 30, 2020

(65) Prior Publication Data
US 2021/0303542 A1    Sep. 30, 2021

(30) Foreign Application Priority Data

Jul. 25, 2018 (CN) .......................... 201810829033.5

(51) Int. Cl.
*G06F 15/16* (2006.01)
*G06F 16/23* (2019.01)
(Continued)

(52) U.S. Cl.
CPC ............ *G06F 16/23* (2019.01); *G06F 16/953* (2019.01); *G06F 30/31* (2020.01); *G06F 30/394* (2020.01); *G06F 2111/20* (2020.01)

(58) Field of Classification Search
CPC ........ G06F 16/23; G06F 16/953; G06F 30/39; G06F 30/31; G06F 2111/20
See application file for complete search history.

(56) References Cited

U.S. PATENT DOCUMENTS 7,361,988 B2    4/2008 Morgan et al.
2006/0059447 A1*  3/2006 Ariyama ................. G06F 30/39
                                                           716/126
(Continued)

FOREIGN PATENT DOCUMENTS

CN    103198374 A    7/2013
CN    103294842 A    9/2013
(Continued)

*Primary Examiner* — Alex Gofman
(74) *Attorney, Agent, or Firm* — Global IP Services; Tianhua Gu (57) ABSTRACT

An EDA pad package library updating/application method and system, a medium, and a terminal. The method includes: extracting a graphic data of a pad and setting information of a component based on the pad from an EDA wiring data; querying and downloading a graphic model of the component according to attribute information of the component; forming a simulated package pad by simulating and assembling the graphical model of the component and the graphical data of the pad according to setting information of the component based on the pad; storing the simulated package pad in a model database, updating an existed EDA pad package library by associating the simulated package pad to a predetermined keyword/words in the model database. A package pad created by others can be quickly obtained without a package pad library. The best pads that have been verified can be updated continuously and quickly.

13 Claims, 4 Drawing Sheets

(51) Int. Cl.
*G06F 16/953* (2019.01)
*G06F 30/31* (2020.01)
*G06F 30/394* (2020.01)
*G06F 111/20* (2020.01)

(56) References Cited

U.S. PATENT DOCUMENTS

2008/0134123 A1\* 6/2008 Kato ........................ G06F 30/34
716/139
2018/0196741 A1\* 7/2018 Qureshi .................... G06F 8/60

FOREIGN PATENT DOCUMENTS

| CN | 106227946 A | 12/2016 |
| CN | IO7368647 A | 11/2017 |

\* cited by examiner

EDA PAD PACKAGE LIBRARY UPDATING/APPLICATION METHOD AND SYSTEM, MEDIUM AND TERMINAL

CROSS REFERENCE TO RELATED PATENT APPLICATION

The present application is the US national stage of PCT/CN2018/108339 filed on Sep. 28, 2018, which claims the priority of the Chinese patent applications No. 201810829033.5 filed on Jul. 25, 2018, which application is incorporated herein by reference.

FIELD OF DISCLOSURE

The present disclosure belongs to the technical field of pad packaging, and relates to an updating/application method and system, in particular to an Electronic Design Automation (EDA) pad package library updating/application method and system, a medium and a terminal.

DESCRIPTION OF RELATED ARTS

Pad package library is the most important library involved in EDA wiring design. In the initial stage of design, EDA designers basically draw the pads according to the recommended pads in the component data specification datasheet PDF document. There are two current pad drawing methods, one is to draw through the functional module that comes with the EDA wiring software, and the other is to use a third-party pad drawing tool, such as "LP Wizard".

It is troublesome to draw pads using EDA software's own module, which mainly depends on the engineer's experience. The engineers are required to have a very proficient level and draw the package pads while looking at the datasheet. Obviously, this method is inefficient.

Although the third-party pad drawing tool "LP Wizard" is convenient to draw, which can improve the drawing speed by using the IPC-7351 standard, it is still not possible to achieve rapid and batch drawing pad packaging and optimization and refinement of pad packaging.

Therefore, how to provide an EDA pad package library updating/application method and system, a medium, and a terminal to solve the defects of the existing technology, such as to achieve the rapid and batch drawing pad packaging and the optimization and extraction of pad packaging, has become a technical problem to be solved by those skilled in the art.

SUMMARY

The present disclosure provides an EDA pad package library updating/application method and system, a medium, and a terminal to solve the problem that the rapid and batch drawing pad packaging and the optimization and extraction of pad packaging cannot be achieved.

The present disclosure provides an EDA pad package library updating method. The method includes: extracting a graphic data of a pad and setting information of a component based on the pad from an EDA wiring data; querying and downloading a graphic model of the component according to attribute information of the component; forming a simulated package pad by simulating and assembling the graphical model of the component and the graphical data of the pad according to the setting information of the component based on the pad; and storing the simulated package pad in a model database, and updating an existed EDA pad package library by associating the simulated package pad to a predetermined keyword/words in the model database.

In an embodiment of the present disclosure, the EDA pad package library updating method further includes: uploading the updated EDA pad package library to a server.

In an embodiment of the present disclosure, the attribute information of the component includes a manufacturer name and a manufacturer code of the component, or a bill of material; and the setting information of the component based on the pad includes coordinate information of the component on the pad and a placement angle of the component in the pad.

In an embodiment of the present disclosure, the querying and downloading of the graphic model of the component according to the attribute information of the component includes: querying and downloading the graphic model of the component from the model database according to the manufacturer name and the manufacturer code of the component, or according to the bill of material.

In an embodiment of the present disclosure, the forming of the simulated package pad by simulating and assembling the graphical model of the component and the graphical data of the pad according to the setting information of the component based on the pad includes: drawing the graphic model of the component on the pad according to the coordinate information of the component on the pad and the placement angle of the component in the pad until all pins of the component collide with the pad.

In an embodiment of the present disclosure, the updating of the existed EDA pad package library includes: creating the package pad stored in the model database or updating the package pad stored in the model database to the EDA pad package library by using an API interface of the EDA.

The present disclosure further provides an application method based on the EDA pad package library updating method. The application method includes: sending a connection request from a client terminal to a server to be uploaded, wherein the EDA pad packaging library is stored on the server; and querying a corresponding EDA pad package library according to attribute information of the pad or a keyword/words of the pad.

The present disclosure further provides an EDA pad package library updating system. The updating system includes: an extraction module for extracting a graphic data of a pad and setting information of a component based on the pad from an EDA wiring data; a query download module for querying and downloading a graphic model of the component according to attribute information of the component; a simulation module for forming a simulated package pad by simulating and assembling the graphical model of the component and the graphical data of the pad according to the setting information of the component based on the pad; a storage module for storing the simulated package pad in a model database; and an association module for updating an existed EDA pad package library by associating the simulated package pad to a predetermined keyword/words in the model database.

The present disclosure further provides an application system based on the EDA pad package library updating system. The application system includes: a communication module for sending a connection request from a client terminal to a server to be uploaded, wherein the EDA pad packaging library is stored on the server; and a query module for querying a corresponding EDA pad package library according to attribute information of the pad or a keyword/word of the pad.

The present disclosure further provides a storage medium storing a computer program, when executed by a processor, the computer program causes the processor to implement the EDA pad package library updating method or the application method based on the EDA pad package library updating method.

The present disclosure further provides a terminal. The terminal includes a processor and a memory; the memory stores a computer program, and the processor executes the computer program stored in the memory, such that the terminal implements the EDA pad package library updating method or the application method based on the EDA pad package library updating method.

As described above, the EDA pad package library updating/application method and system, the medium, and the terminal of the present disclosure have the following beneficial effects:

First, a package pad created by others can be quickly obtained without a package pad library.

Second, the best pads that have been verified can be updated continuously and quickly.

Third, data is stored for big data analysis of a physical component corresponding to the package pad.

DESCRIPTION OF REFERENCE NUMERALS

11 Terminal
12 Server
3 EDA pad package library updating system
31 Extraction module
32 Query download module
33 Simulation module
34 Storage module
35 Association module
36 Update module
37 Communication module
4 Terminal
41 Processor
42 Memory
43 Transceiver
44 Communication interface
45 System bus
S21-S25 Operations

DETAILED DESCRIPTION OF THE PREFERRED EMBODIMENTS

The embodiments of the present disclosure will be described below through exemplary embodiments. Those skilled in the art can easily understand other advantages and effects of the present disclosure according to contents disclosed by the specification. The present disclosure can also be implemented or applied through other different exemplary embodiments. Various modifications or changes can also be made to all details in the specification based on different points of view and applications without departing from the spirit of the present disclosure. It needs to be stated that the following embodiments and the features in the embodiments can be combined with one another under the situation of no conflict.

It needs to be stated that the drawings provided in the following embodiments are just used for schematically describing the basic concept of the present disclosure, thus only illustrating components only related to the present disclosure and are not drawn according to the numbers, shapes and sizes of components during actual implementation, the configuration, number and scale of each component during actual implementation thereof may be freely changed, and the component layout configuration thereof may be more complicated.

At present, the establishment of the package pad library for designing EDA in the industry is drawn by the EDA designer according to the recommended pad in the datasheet provided by the component manufacturer. However, the recommended pad has not been fully verified by actual assembly, nor has it been improved and verified based on actual product requirements. The EDA pad package library updating method and the EDA pad package library application method of the present disclosure can extract the pad package of the wiring PCB board designed by other EDA designers that has been manufactured and return the pad package to the EDA library, to realize the sharing of post-packaged pad library without being restricted by design software. That is, as long as the used component is unchanged, the package pad library can be shared, and it has been verified through actual production.

Embodiment 1

This embodiment provides an EDA pad package library updating method. The updating method includes: extracting a graphic data of a pad and setting information of a component based on the pad from an EDA wiring data; querying and downloading a graphic model of the component according to attribute information of the component; forming a simulated package pad by simulating and assembling the graphical model of the component and the graphical data of the pad according to the setting information of the component based on the pad; and storing the simulated package pad in a model database, and updating an existed EDA pad package library by associating the simulated package pad to a predetermined keyword/word in the model database.

Figure 1:
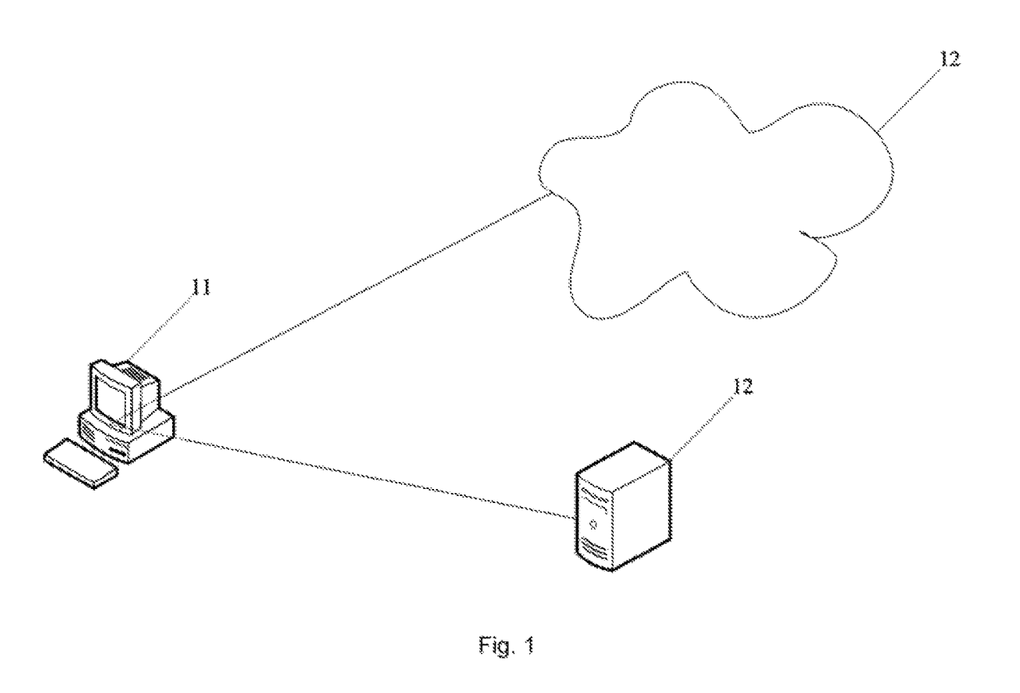
FIG. 1 shows a schematic view of a scenario where the EDA pad package library updating method of the present disclosure is applied.

The EDA pad package library updating method provided in this embodiment will be described in detail below with reference to the drawings. The EDA pad package library updating method in this embodiment is applied to the scenario shown in FIG. 1. The scenario includes a terminal 11 and a server 12 communicating with the terminal 11, and the server 12 includes a cloud terminal or a local area network server.

Figure 2:
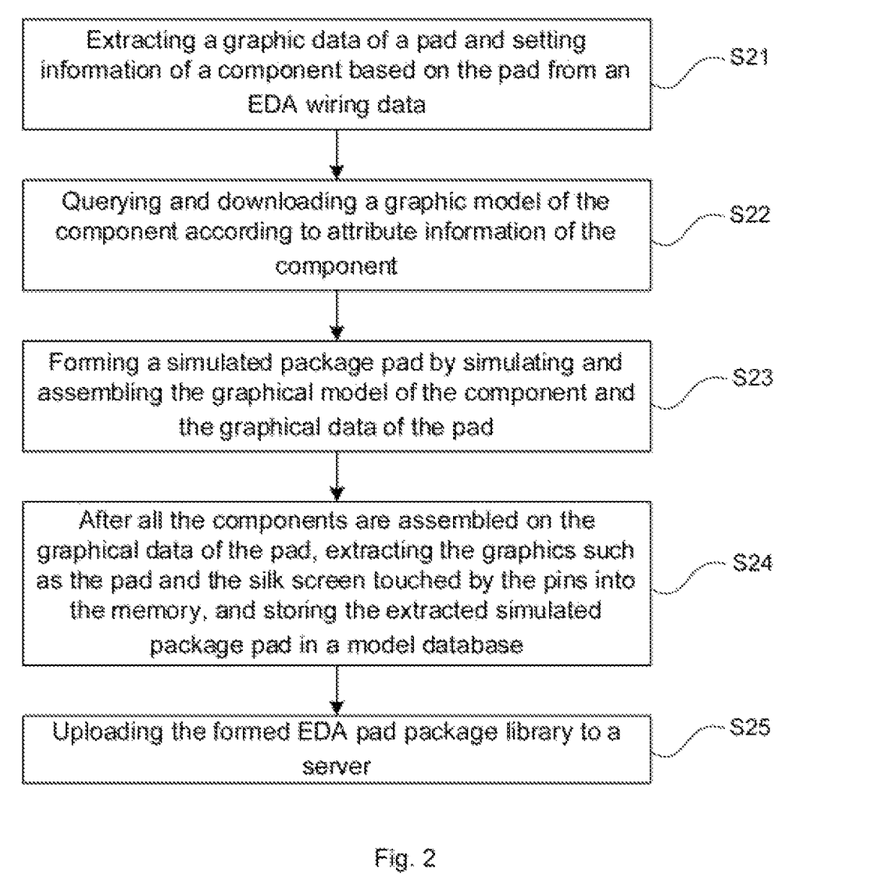
FIG. 2 shows a schematic flow chart of the EDA pad package library updating method according to an embodiment of the present disclosure.

Referring to FIG. 2, which shows a schematic flowchart of an EDA pad package library updating method in an embodiment. As shown in FIG. 2, the EDA pad package library updating method specifically includes the following operations:

S21: extracting a graphic data of a pad and setting information of a component based on the pad from an EDA wiring data. In this embodiment, the setting information of the component based on the pad includes coordinate information of the component on the pad and a placement angle of the component in the pad.

S22: querying and downloading a graphic model of the component according to attribute information of the component. In this embodiment, the attribute information of the component includes a manufacturer name and a manufacturer code of the component, or a bill of material.

For example, the manufacturer name of the component A1 is A2 and the manufacturer code of the component A1 is A3, the graphic model of the component corresponding to the manufacturer name A2 and the manufacturer code A3 is queried and downloaded from the preset model database (or the preset 2D or 3D model database).

S23: forming a simulated package pad by simulating and assembling the graphical model of the component and the graphical data of the pad through the setting information of the component based on the pad.

In this operation, first find the corresponding position on the graphical data of the pad according to the coordinate information of the component on the pad, and then draw the graphical model of the component on the pad according to the placement angle of the component in the pad until all the pins of the component hit the pad.

For example, if the placement angle cannot make all the pins hit the pad, add 90 degrees to the placement angle. If it is still not possible to make all the pins hit the pad, the physical component is placed by adding the placement angle for 1 degree each time until all the pins hit the pad.

S24: after all the components are assembled on the graphical data of the pad, extracting the graphics such as the pad and the silk screen touched by the pins into the memory, and storing the extracted simulated package pad in a model database. In this embodiment, the simulated package pad includes a pad layer, a silk screen layer, a solder resist layer, a keepout layer, and the like. In this embodiment, while the extracted graphic is saved in the model database, in the model database, an existed 6 EDA pad package library is updated by associating the simulated package pad to a predetermined keyword/words or by adding keywords in the related fields of EDA wiring for the simulated package pad, such as power board, RF board, base station board, mobile phone board, etc. In this embodiment, the predetermined keyword/words include the manufacturer name and the manufacturer code.

In this embodiment, the package pad stored in the model database is created or updated to the EDA pad package library by using an API interface of the EDA.

Specifically, EDA's API interface is used. For example, CADENCE Allegro's script or skill is used to update the pad layer and silk screen and other layers in the *.dra file, or the script or skill language is run to create a new package for designing wiring.

For example, the EDA pad package library design software requests to generate its script and generate a new dra file. Different EDA softwares use the corresponding API interfaces to generate the EDA pad package library files.

In this embodiment, other EDA design softwares such as Altium Designer, PADS, etc. are also used to implement the above-mentioned EDA pad package library updating method.

S25: uploading the formed EDA pad package library to a server.

This embodiment further provides an application method based on the above EDA pad package library updating method. The application method includes: sending a connection request from a client terminal to a server to be uploaded, the EDA pad packaging library is stored on the server; and querying a corresponding EDA pad package library according to attribute information of the pad or a keyword/words of the pad.

This embodiment further provides a storage medium (also referred to computer readable storage medium), which stores a computer program, when executed by a processor, the computer program causes the processor to implement the EDA pad package library updating method or the application method based on the EDA pad package library updating method.

Those of ordinary skill will understand that all or part of the operations to implement the various method embodiments described above may be accomplished by hardware associated with a computer program. The computer program may be stored in a computer readable storage medium. The program, when executed, performs the operations including the above method embodiments. The foregoing storage medium includes various medium that may store program codes, such as a ROM, a RAM, a magnetic disk, or an optical disk.

The EDA pad package library updating method and the EDA pad package library application method described in this embodiment have the following beneficial effects:

First, a package pad created by others can be quickly obtained without a package pad library.

Second, the best pads that have been verified can be updated continuously and quickly.

Third, data is stored for big data analysis of a physical component corresponding to the package pad.

Embodiment 2

This embodiment provides an EDA pad package library updating system. The updating system includes: an extraction module for extracting a graphic data of a pad and setting information of a component based on the pad from an EDA wiring data; a query download module for querying and downloading a graphic model of the component according to attribute information of the component; a simulation module for forming a simulated package pad by simulating and assembling the graphical model of the component and the graphical data of the pad according to the setting information of the component based on the pad; a storage module for storing a simulated package pad in a model database; and an association module for updating an existed EDA pad package library by associating the simulated package pad to a predetermined keyword/words in the model database.

The EDA pad package library updating system provided in this embodiment will be described in detail below with reference to the drawings. It should be noted that the division of each module of the above system is only a division of logical functions. In actual implementation, the modules may be integrated into one physical entity in whole or in part, or may be physically separated. And these modules may all be implemented in the form of processing component calling by software, or they may all be implemented in the form of hardware. It is also possible that some modules are implemented in the form of processing component calling by software, and some modules are implemented in the form of hardware. For example, an x module may be a separate processing component, or may be integrated in a chip of the above-mentioned system. In addition, the x module may also be stored in the memory of the above system in the form of program code. The function of the above x module is called and executed by a processing component of the above system. The implementation of other modules is similar. All or part of these modules may be integrated or implemented independently. The processing elements described herein may be an integrated circuit with signal processing capabilities. In the implementation process, each operation of the above method or each of the above modules may be completed by an integrated logic circuit of hardware in the processor element or an instruction in a form of software. The above modules may be one or more integrated circuits configured to implement the above method, such as one or more Application Specific Integrated Circuits (ASICs), one or more Digital Signal Processors (DSPs), or one or more Field Programmable Gate Arrays (FPGAs). When one of the following modules is implemented in the form of calling program codes by a processing component, the processing component may be a general processor, such as a Central Processing Unit (CPU) or other processors that may call program codes. These modules may be integrated and implemented in the form of a system-on-a-chip (SOC).

Figure 3:
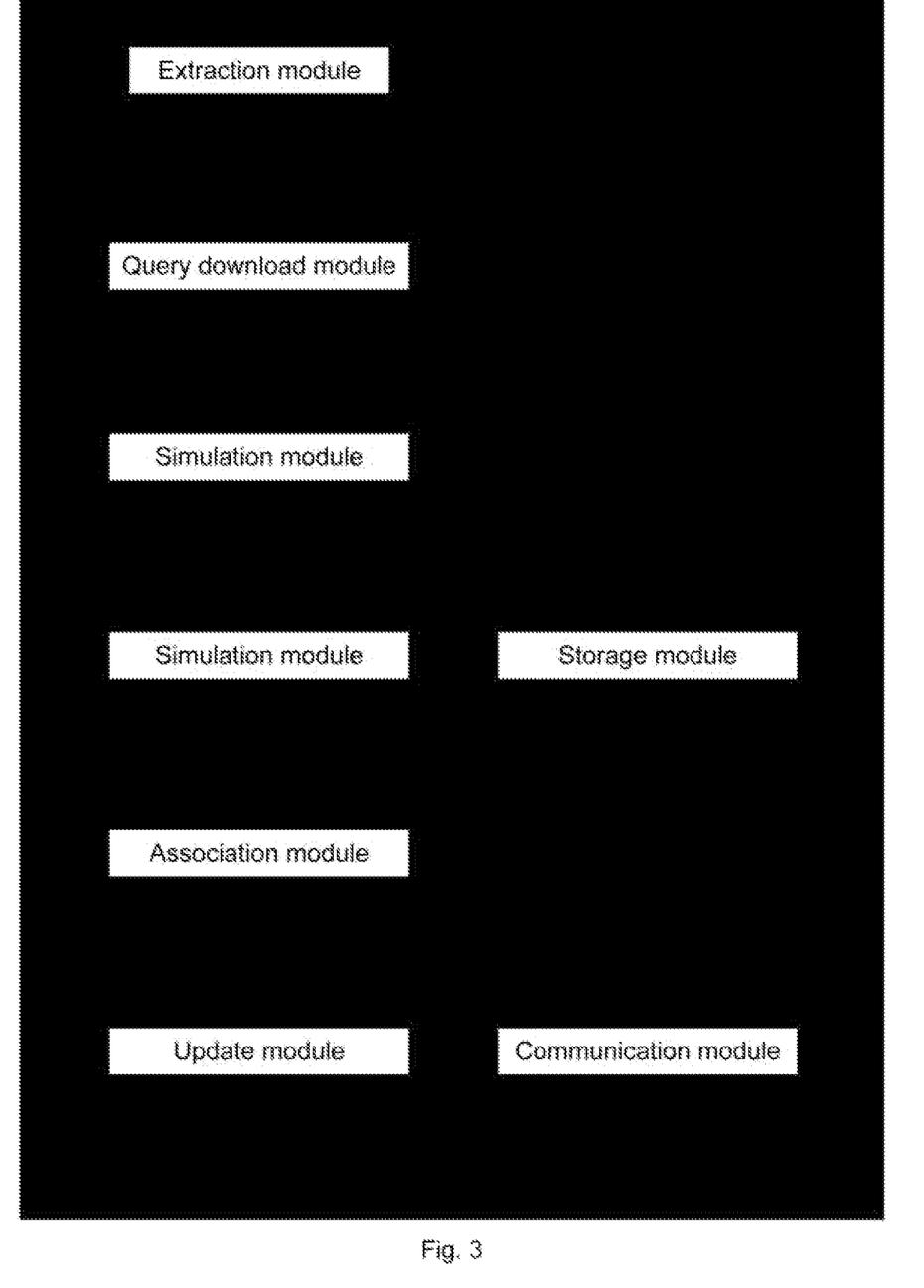
FIG. 3 shows a schematic view of an EDA pad package library updating system according to an embodiment of the present disclosure.

Referring to FIG. 3, the updating system 3 of the EDA pad package library includes: an extraction module 31, a query download module 32, a simulation module 33, a storage module 34, an association module 35, an update module 36, and a communication module 37.

The extraction module 31 extracts a graphic data of a pad and setting information of a component based on the pad from an EDA wiring data. In this embodiment, the setting information of the component based on the pad includes coordinate information of the component on the pad and a placement angle of the component in the pad.

The query download module 32 coupled with the extraction module 31 queries and downloads a graphic model of the component according to attribute information of the component. In this embodiment, the attribute information of the component includes a manufacturer name and a manufacturer code of the component, or a bill of material.

The simulation module 33 coupled with the extraction module 31 and the query download module 32 forms a simulated package pad by simulating and assembling the graphical model of the component and the graphical data of the pad through the setting information of the component based on the pad.

First, the simulation module 33 finds the corresponding position on the graphical data of the pad according to the coordinate information of the component on the pad, and then draws the graphical model of the component on the pad according to the placement angle of the component in the pad until all the pins of the component hit the pad.

After all the components are assembled on the graphical data of the pad, the extraction module 31 extracts the graphics such as the pad and the silk screen touched by the pins into the memory, and the storage module 34 stores the extracted simulated package pad in a model database. In this embodiment, the simulated package pad includes a pad layer, a silk screen layer, a solder resist layer, a keepout layer, and the like. In this embodiment, while the extracted graphic is saved in the model database, in the model database, the association module 35 coupled with the simulation module 33 and the storage module 34 associates the simulated package pad to a predetermined keyword/words, or keywords in the related fields of EDA wiring are added for the simulated package pad, such as power board, RF board, base station board, mobile phone board, etc., to update the existed EDA pad package library. In this embodiment, the predetermined keyword/words include the manufacturer name and the manufacturer code.

In this embodiment, the update module 36 coupled with the association module 35 creates or updates the package pad stored in the model database to the EDA pad package library by using an API interface of the EDA.

Specifically, EDA's API interface is used. For example, CADENCE Allegro's script or skill is used to update the pad layer and silk screen and other layers in the *.dra file, or the script or skill language is run to create a new package for designing wiring.

For example, the EDA pad package library design software requests to generate its script and generate a new dra file. Different EDA softwares use the corresponding API interfaces to generate the EDA pad package library files.

In this embodiment, other EDA design softwares such as Altium Designer, PADS, etc. are also used to implement the above-mentioned EDA pad package library updating system.

The communication module 37 coupled with the update module 36 uploads the formed EDA pad package library to a server.

This embodiment further provides an application system based on the above EDA pad package library updating system. The application system includes:

a communication module for sending a connection request from a client terminal to a server to be uploaded, the EDA pad packaging library is stored on the server; and a query module for querying a corresponding EDA pad package library according to attribute information of the pad or a keyword/words of the pad.

Embodiment 3

Figure 4:
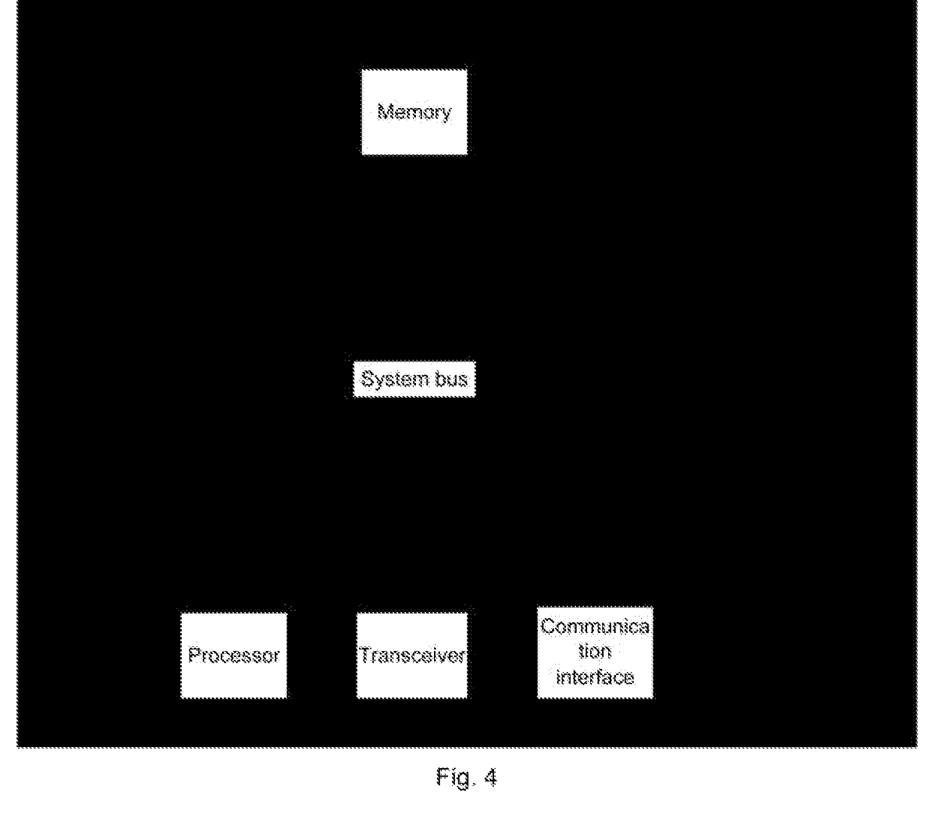
FIG. 4 shows a schematic view of a terminal according to an embodiment of the present disclosure.

This embodiment provides a terminal 4, and the terminal 4 includes: a processor 41, a memory 42, a transceiver 43, a communication interface 44, or/and a system bus 45. The memory 42 and communication interface 44 are coupled with the processor 41 and the transceiver 43 through the system bus 45 to implement mutual communication. The memory 42 stores computer programs, the communication interface 44 communicates with other devices, and the processor 41 and transceiver 43 run computer programs to cause the terminal 4 to perform the operations of the EDA pad package library updating method or the operations of the application method based on the EDA pad package library updating method.

The system bus mentioned above may be a Peripheral Component Interconnect (PCI) bus or an Extended Industry Standard Architecture (EISA) bus, etc. The system bus may be divided into address bus, data bus, control bus and so on. For convenience of representation, only a thick line is used in the figure, but it does not mean that there is only one bus or one type of bus. The communication interface is used to implement communication between the database access device and other devices (such as a client, a read-write library, and a read-only library). The memory may include Random Access Memory (RAM), or may also include non-volatile memory, such as at least one disk memory.

The above processor may be a general processor, including a Central Processing Unit (CPU), a Network Processor (NP), and the like. It may also be a Digital Signal Processor (DSP), an Application Specific Integrated Circuit (ASIC), a Field-Programmable Gate Array (FPGA), or other programmable logic devices, discrete gate or transistor logic devices, or discrete hardware components.

As described above, the EDA pad package library updating/application method and system, the medium, and the terminal of the present disclosure have the following beneficial effects:

First, a package pad created by others can be quickly obtained without a package pad library.

Second, the best pads that have been verified can be updated continuously and quickly.

Third, data is stored for big data analysis of a physical component corresponding to the package pad.

The present disclosure effectively overcomes various shortcomings and has high industrial utilization value.

The above-mentioned embodiments are just used for exemplarily describing the principle and effects of the present disclosure instead of limiting the present disclosure. Those skilled in the art can make modifications or changes to the above-mentioned embodiments without going against the spirit and the range of the present disclosure. Therefore, all equivalent modifications or changes made by those who have common knowledge in the art without departing from the spirit and technical concept disclosed by the present disclosure shall be still covered by the claims of the present disclosure.

What is claimed is:

1. An EDA pad package library updating method, comprising:
    extracting a graphic data of a pad and setting information of a component based on the pad from an EDA wiring data, wherein the setting information of the component based on the pad comprises a placement angle of the component in the pad;
    querying and downloading a graphic model of the component according to attribute information of the component;
    forming a simulated package pad by simulating and assembling the graphical model of the component and the graphical data of the pad according to the setting information of the component based on the pad, by drawing the graphical model of the component onto the pad according to the placement angle of the component in the pad, wherein in response to determining the placement angle cannot make all pins of the component hit the pad, the placement angle is first adjusted by 90 degrees to see if all the pins hit the pad; and then in response to determining the adjusted placement angle still cannot make all the pins hit the pad, the adjusted placement angle is adjusted in increments of 1 degree until all the pins hit the pad; and
    storing the simulated package pad in a model database, and updating an existed EDA pad package library by associating the simulated package pad to a predetermined keyword/words in the model database.

2. The EDA pad package library updating method according to claim 1, further comprising:
    uploading the updated EDA pad package library to a server.

3. The EDA pad package library updating method according to claim 1, wherein:
    the attribute information of the component includes a manufacturer name and a manufacturer code of the component, or a bill of material; and
    the setting information of the component based on the pad includes coordinate information of the component on the pad and the placement angle of the component in the pad.

4. The EDA pad package library updating method according to claim 3, wherein said querying and downloading of the graphic model of the component according to the attribute information of the component comprises:
    querying and downloading the graphic model of the component from the model database according to the manufacturer name and the manufacturer code of the component, or according to the bill of material.

5. The EDA pad package library updating method according to claim 3, wherein said updating of the existed EDA pad package library comprises:
    creating the package pad stored in the model database or updating the package pad stored in the model database to the EDA pad package library by using an API interface of the EDA.

6. An application method based on the EDA pad package library updating method according to claim 1, comprising:
    sending a connection request from a client terminal to a server to be uploaded, wherein the EDA pad packaging library is stored on the server; and
    querying a corresponding EDA pad package library according to attribute information of the pad or a keyword/words of the pad.

7. The EDA pad package library updating method according to claim 1, wherein the setting information of the component based on the pad further comprises coordinate information of the component on the pad.

8. The EDA pad package library updating method according to claim 7, wherein before drawing the graphical model of the component onto the pad, the method further comprises finding a position on the graphical data of the pad according to the coordinate information of the component on the pad.

9. The EDA pad package library updating method according to claim 1, the simulated package pad comprises one or more of a pad layer, a silk screen layer, a solder resist layer, and a keepout layer.

10. An EDA pad package library updating system, comprising:
    an extraction module for extracting a graphic data of a pad and setting information of a component based on the pad from an EDA wiring data, wherein the setting information of the component based on the pad comprises a placement angle of the component in the pad;
    a query download module for querying and downloading a graphic model of the component according to attribute information of the component;
    a simulation module for forming a simulated package pad by simulating and assembling the graphical model of the component and the graphical data of the pad according to the setting information of the component based on the pad, by drawing the graphical model of the component onto the pad according to the placement angle of the component in the pad, wherein in response to determining the placement angle cannot make all pins of the component hit the pad, the placement angle is first adjusted by 90 degrees to see if all the pins hit the pad; and then in response to determining the adjusted placement angle still cannot make all the pins hit the pad, the adjusted placement angle is adjusted in increments of 1 degree until all the pins hit the pad;
    a storage module for storing the simulated package pad in a model database; and
    an association module for updating an existed EDA pad package library by associating the simulated package pad to a predetermined keyword/words in the model database.

11. An application system based on the EDA pad package library updating system according to claim 10, comprising:

a communication module for sending a connection request from a client terminal to a server to be uploaded, wherein the EDA pad packaging library is stored on the server; and a query module for querying a corresponding EDA pad package library according to attribute information of the pad or a keyword/words of the pad.

12. A non-transitory storage medium storing a computer program, when executed by a processor, the computer program causes the processor to implement an EDA pad package library updating method or the application method based on the EDA pad package library updating method according to claim 7, wherein the EDA pad package library updating method comprises:

extracting a graphic data of a pad and setting information of a component based on the pad from an EDA wiring data;

querying and downloading a graphic model of the component according to attribute information of the component;

forming a simulated package pad by simulating and assembling the graphical model of the component and the graphical data of the pad through the setting information of the component based on the pad, by drawing the graphical model of the component onto the pad according to the placement angle of the component in the pad, wherein in response to determining the placement angle cannot make all pins of the component hit the pad, the placement angle is first adjusted by 90 degrees to see if all the pins hit the pad; and then in response to determining the adjusted placement angle still cannot make all the pins hit the pad, the adjusted placement angle is adjusted in increments of 1 degree until all the pins hit the pad; and storing the simulated package pad in a model database, and updating an existed EDA pad package library by associating according to a predetermined keyword/word in the model database.

13. A terminal, comprising a processor and a memory; wherein the memory is configured to store a computer program, and the processor is configured to execute the computer program stored in the memory, such that the terminal implements an EDA pad package library updating method or the application method based on the EDA pad package library updating method according to claim 7, wherein the EDA pad package library updating method comprises:

extracting a graphic data of a pad and setting information of a component based on the pad from an EDA wiring data;

querying and downloading a graphic model of the component according to attribute information of the component;

forming a simulated package pad by simulating and assembling the graphical model of the component and the graphical data of the pad through the setting information of the component based on the pad, by drawing the graphical model of the component onto the pad according to the placement angle of the component in the pad, wherein in response to determining the placement angle cannot make all pins of the component hit the pad, the placement angle is first adjusted by 90 degrees to see if all the pins hit the pad; and then in response to determining the adjusted placement angle still cannot make all the pins hit the pad, the adjusted placement angle is adjusted in increments of 1 degree until all the pins hit the pad; and storing the simulated package pad in a model database, and updating an existed EDA pad package library by associating according to a predetermined keyword/word in the model database.

* * * * *